O. TOMLINSON.

CAR-AXLE BOX.

No. 7,800. Reissued July 17, 1877.

Witnesses.

Chas. H. Smith

Geo. T. Pinckney

Inventor

Owen Tomlinson.

per Lemuel W. Serrell atty

UNITED STATES PATENT OFFICE.

OWEN TOMLINSON, OF BOMBAY, INDIA.

IMPROVEMENT IN CAR-AXLE BOXES.

Specification forming part of Letters Patent No. 184,808, dated November 28, 1876; Reissue No. 7,800, dated July 17, 1877; application filed April 27, 1877.

*To all whom it may concern:*

Figure 1:
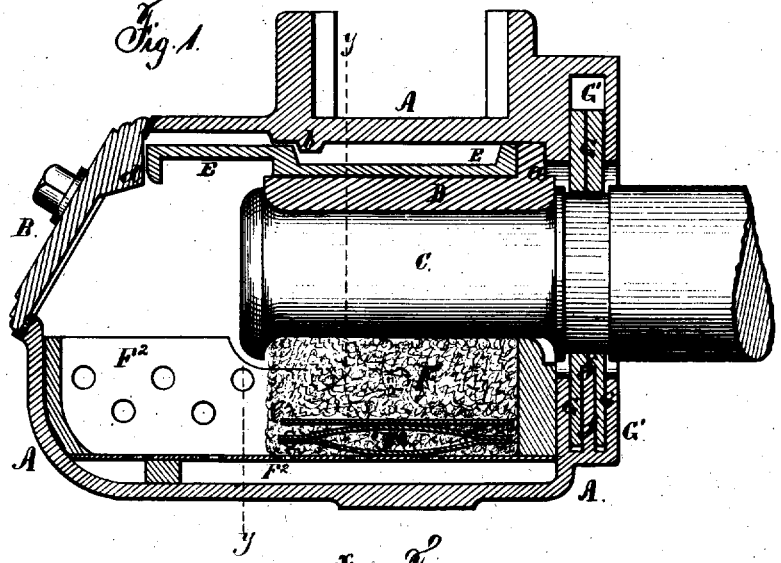
Figure 2:
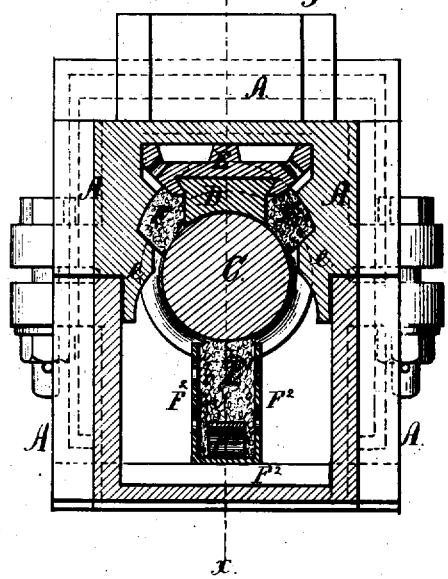
Figure 3:
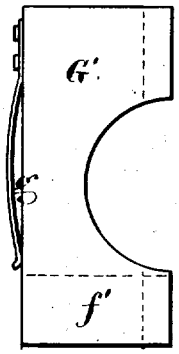
Figure 4:
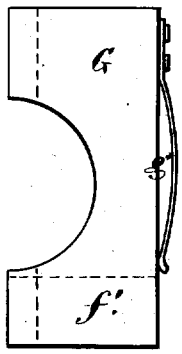

Be it known that I, OWEN TOMLINSON, of Bombay, East Indies, have invented a new and Improved Car-Axle Box, of which the following is a specification:

In the accompanying drawings, Figure 1 represents a vertical longitudinal section of my improved car-axle box taken on line *x x*, Fig. 2. Fig. 2 is a vertical transverse section of the same on line *y y*, Fig. 1; and Figs. 3 and 4 are detail side views of the washers, with side springs arranged to fit the axle to keep out the dust.

Similar letters of reference indicate corresponding parts.

The invention relates to certain improvements in car-axle boxes designed to effect a thorough lubrication thereof; and it consists in the construction and arrangement of parts hereinafter more fully described, and then pointed out in the claims.

In the drawing, A represents an axle-box, which is preferably cast in two parts that are horizontally connected by outside flanges and bolts; or it may be cast in one piece, with a detachable rear section, as described.

The axle-box is supplied with oil at a movable front cap or face-plate, B, that is provided with a suitable packing and fastening-screws.

The car-axle C has suitable collars at both ends of its journal, between which a journal-bearing, D, of corresponding shape, is placed, and retained by an iron keep, E, that is fitted into the top part of the axle-box in such a manner as to perfectly secure the brass or other bearing D in its proper place, and also admit the withdrawing of the bearing and ready replacing of it at a saving of time and labor. The keep or retaining-plate E is connected with the journal-bearing D by a dovetail or similar connection against a change of position in a lateral direction, and by pressing against a projecting rear shoulder, *a*, of the bearing in longitudinal direction.

The keep or retaining-plate E is steadily held in position by a stop-shoulder, *b*, on the inside of the top of the axle-box, entering a recess of the keep, and by an angular cheek or bearing, *d*, of the face-plate pressing against the forward-extending handle end of the keep.

Lubricating-pads F are continuous the entire length of the bearing-surface of the journal, or nearly so. These pads are made of suitable material, and arranged at both sides of the journal-bearing D, and supplied with oil by capillary attraction from the oil-receptacle and base-pad at the lower part of the box.

The required amount of oil to moisten the side pads for action may be supplied by top recesses and side holes of the keep, as shown in Fig. 2. The side packings and sustaining-cheeks are mainly designed to take up the surplus lubricating material by capillary attraction, and retain it for the economical feeding to the journal and journal-box. As the oil fills up the lower oil-space, it is supplied in considerable quantity to the axle, and the side packing serves to regulate the supply and make the same uniform. The required amount of oil, and not more, is thereby supplied, which makes the box very economical. The perforated side plates extend up to the journal, or nearly so, to support the pad.

The lubricating-pads F are securely held in position on the journal of the axle at both sides of the bearing D by the iron keep and projections or cheeks *e* at both sides of the axle-box. The pads insure thorough lubrication of the journal without necessitating a too frequent refilling of the axle-box. The bottom pad $F^1$ is retained by perforated longitudinal side and bottom plates $F^2$, and pressed up against the axle by suitable springs $F^3$ placed into the case of the pad.

The oil is fed from the oil-receptacle through the perforated plates to the bottom pad, and, by capillary attraction along the revolving axle, to the side pads and to the journal-bearing.

The rear part of the axle-box A is closed by means of wooden or other dust-plates or washers G that are placed into a rear chamber or receptacle, G′, of the axle-box. A central partition, *f*, at the lower part of the chamber G′, fits into a deep channel or groove, *f′*, of the washer, which is made in two pieces fitted together with a lap-joint. The sections of the washer are made to maintain a thorough fit on the axle by being pressed toward each other by a spring, *g*, that is affixed to the outer edge of each half of the washer, and intended to keep the washer-sections pressed gently, but continuously, against the axle, the springs acting between the dust-plates and the side walls of the axle-box. These dust-plates are provided at the lap-joints with a certain clearance or allowance for admitting, with the wearing of the washer, the gradual closing up of the sections by the action of the springs, while preserving at all times a close seating on the axle, so as to keep out impurities that tend to cut and wear out the journal.

If the brass bearing D is to be removed the cap-plate B is taken off, the bolts loosened, the bottom half of the axle-box lowered, rods or keys inserted between the upper and lower sections, and the box raised by a jack or lever; then the keep E and bearing D can be easily withdrawn, and another bearing, D, introduced with the keep.

The axle-box can be made smaller and more compact when in two pieces than when cast in one, because the parts can be separated to give the space required for removal of the keep and bearing, and there is no risk of oil running out because the joint is above the oil level, and the top part of the axle-box sets within the bottom part.

In consequence of the partition *f* rising higher than the inner face of the axle-box adjacent to the journal, oil will not flow out of the first oil-receptacle by any undulation of the oil, and this partition and the deep groove of the dust-plates G insure the exclusion of dust and saving of oil.

I claim as my invention—

1. The separate continuous solid bearing D and cheeks *e*, in combination with the continuous lubricating-pads F at each side of the journal, and extending from end to end, or nearly so, of the bearing-surface, substantially as set forth.

2. The dust-plate G, made with a deep channel across its lower edge, in combination with the axle-box having the oil-receptacles that are separated by the partition *f*, substantially as and for the purposes set forth.

3. In an axle-box, the combination of the cheeks *e*, lubricating-pads F, detachable keep E, and bearing D, substantially as and for the purposes set forth.

4. The removable keep E, having a dovetailed recess, in combination with the bearing D fitting into such recess, so that the two can be removed together, as specified.

Signed by me this 3d day of March, A. D. 1877.

OWEN TOMLINSON.

Witnesses:

JAMES H. CRAWLEY BOEVEY,

BABWAO SUCCARLEM,

*Clerk to Messrs. Crawford & Boevey.*